United States Patent
Kazanchian et al.

(10) Patent No.: US 10,038,770 B2
(45) Date of Patent: Jul. 31, 2018

(54) PUSH USER INTERFACE

(71) Applicant: RF Digital Corporation, Hermosa Beach, CA (US)

(72) Inventors: Armen E. Kazanchian, Hermosa Beach, CA (US); Stephen Michael Praed, Wheat Ridge, CO (US)

(73) Assignee: RF Digital Corporation, Hermosa Beach, CA (US)

( * ) Notice: Subject to any disclaimer, the term of this patent is extended or adjusted under 35 U.S.C. 154(b) by 0 days.

(21) Appl. No.: 14/834,302

(22) Filed: Aug. 24, 2015

(65) Prior Publication Data
US 2016/0057270 A1 Feb. 25, 2016

Related U.S. Application Data

(60) Provisional application No. 62/041,631, filed on Aug. 25, 2014.

(51) Int. Cl.
| H04M 3/00 | (2006.01) |
| H04M 1/725 | (2006.01) |
| H04W 4/00 | (2018.01) |
| H04W 4/02 | (2018.01) |
| H04W 4/60 | (2018.01) |

(52) U.S. Cl.
CPC ... *H04M 1/72525* (2013.01); *H04M 1/72572* (2013.01); *H04W 4/003* (2013.01); *H04W 4/023* (2013.01); *H04W 4/60* (2018.02)

(58) Field of Classification Search
CPC ......... H04M 1/72525; H04M 1/72572; H04W 4/003; H04W 4/023
See application file for complete search history.

(56) References Cited

U.S. PATENT DOCUMENTS

| 8,490,139 | B2 | 7/2013 | Griffin | |
| 9,143,932 | B1* | 9/2015 | Feldman | H04W 12/02 |
| 2003/0034957 | A1 | 2/2003 | Dubil et al. | |
| 2006/0253570 | A1* | 11/2006 | Biswas | H04L 41/0816 709/224 |
| 2006/0255963 | A1 | 11/2006 | Thompson et al. | |
| 2007/0067269 | A1 | 3/2007 | Rudge et al. | |
| 2009/0210932 | A1* | 8/2009 | Balakrishnan | H04W 4/02 726/5 |

(Continued)

FOREIGN PATENT DOCUMENTS

EP 2 230 596 A1 9/2010

OTHER PUBLICATIONS

International Preliminary Report on Patentability and Written Opinion issued in application No. PCT/US2015/046611, dated Feb. 28, 2017, 13 pages.

(Continued)

*Primary Examiner* — Erin M File
(74) *Attorney, Agent, or Firm* — Fish & Richardson P.C.

(57) ABSTRACT

Exemplary embodiments may be used as a Push-User Interface (UI) for electronic devices, such as smartphones and tablets and other similar devices, including personal computers, watches, etc. The system may be used with a remote device having a wireless communication interface such that a unique UI is pushed from the remote device to the electronic device to create a user interface experience specific to the remote device on the electronic device.

14 Claims, 9 Drawing Sheets

(56) References Cited

U.S. PATENT DOCUMENTS

| | | | |
|---|---|---|---|
| 2011/0047510 A1* | 2/2011 | Yoon | H04M 1/72566 715/835 |
| 2011/0145863 A1 | 6/2011 | Alsina et al. | |
| 2012/0071100 A1* | 3/2012 | Fadell | G06F 15/025 455/41.2 |
| 2012/0089425 A1* | 4/2012 | Borucki | G06Q 10/025 705/5 |
| 2012/0146918 A1 | 6/2012 | Kreiner et al. | |
| 2012/0174236 A1* | 7/2012 | Goodwin | H04L 63/102 726/27 |
| 2012/0212668 A1* | 8/2012 | Schultz | H04N 5/23206 348/468 |
| 2012/0220284 A1 | 8/2012 | Tadayon et al. | |
| 2012/0309373 A1 | 12/2012 | Abogendia | |
| 2013/0003880 A1 | 1/2013 | Lu et al. | |
| 2014/0087770 A1* | 3/2014 | Cho | H04W 4/02 455/457 |
| 2014/0132411 A1 | 5/2014 | Buchheim et al. | |
| 2014/0168100 A1* | 6/2014 | Argiro | G06F 3/0416 345/173 |
| 2014/0267234 A1* | 9/2014 | Hook | H04W 4/02 345/419 |
| 2014/0349687 A1* | 11/2014 | Li | H04L 65/1063 455/456.3 |
| 2015/0065175 A1* | 3/2015 | Kokubo | H04W 4/02 455/456.3 |
| 2015/0074765 A1* | 3/2015 | Haight | H04L 63/083 726/4 |
| 2015/0205504 A1* | 7/2015 | Chanda | G06F 3/0489 715/773 |
| 2016/0037332 A1* | 2/2016 | Egeler | G08C 17/02 455/420 |

OTHER PUBLICATIONS

Supplementary European Search Report issued in EP Application No. 158348441.1, dated Apr. 6, 2018, 9 pages.

* cited by examiner

PUSH USER INTERFACE

PRIORITY

This application claims priority to U.S. Application No. 62/041,631, filed Aug. 25, 2014, which is incorporated by reference in its entirety into this application.

BACKGROUND

Currently, a user may use their mobile device, such as smartphone or tablet, as a user interface (UI) for another piece of hardware. The conventional way to provide the user interface to a user of a mobile device is to download an application (App) from Google Play, the Apple App Store, or other vendor onto the phone or tablet. The App is made specifically for the given mobile device (i.e. Android or Apple) and for the given piece of hardware. That App then interfaces with the piece of hardware wirelessly.

The downloaded application is pre-configured for a specific type of hardware, and is generally registered or linked before use to a single target hardware such as a heart rate monitor, thermostat, keyless entry to your home or a painting in an art gallery that delivers the information to the mobile device to present the information on the user interface in a predefined format.

Currently, the user needs a separate App for the specific mobile device and for each of the pieces of hardware types that are communicating with the mobile device. The user may therefore need to use thousands of applications. The conventional system requires a user to identify the hardware to a mobile device, know the name of the App that is needed for the communication, go to the App Store, log-in, download the app, install the App, configure the app, learn how to use the App, then associate the App with the hardware to which you want to interface. Also there had to be some sign at the hardware location leading you to the name of the App you need to download to even get that far. That is all for just one single device, the user would need to repeat this for every device.

A web-server using a WiFi device may also be used to present a user interface to a user from a separate hardware device. This means a WiFi host device is mounted at the hardware or other location where data is to be communicated. Then, when the mobile device (such as the smartphone) is near the hardware device, the user must navigate the WiFi settings on the mobile device, search for a network, connect to the network, exchange security credentials, establish a connection, then launch a browser (hope the browser will be compatible with the HTML and controls used by the target hardware), then download HTML and render the UI for the user on the mobile device. That is for one location and one hardware. Once you move to the next hardware device, the user will need to repeat this process again, to get the next hardware association. Once the user makes one association, the mobile device will drop the prior one, as the device can only connect with one WiFi target (or in this case host) at a time. Aside from the web server needing a large memory footprint to run, WiFi consumes a lot of power and is not suited for battery powered applications which is needed for practical applications.

Accordingly, the available approaches for rendering a user interface on a mobile device of unconnected hardware need a lot of user knowledge and manual intervention. Accordingly, present options are not very practical for the major stakeholders.

Device manufacturers have to employ multiple software development teams for each product (embedded, Android, iOS, Windows), and the applications that are usually given away, end up costing the company a lot of money for development, and add risk to the overall product life cycle. Additionally, the end customers have to manage the complexity of knowing which application to download, or know how to connect to a temporary WiFi network.

Handling hardware based applications is also very costly to the distributor of applications, such as the app stores for Google, Apple, and Microsoft. Currently, the developer of an application based on hardware needs to ship their hardware along with their software app to the app store for review and approval. This process is conventionally required as it is the only effective way to confirm the app functions properly with the associated hardware. This process is expensive for the administrators of these app stores, as it is labor intensive to receive, catalog, test, and verify the applications before posting. Moreover, hardware based applications are typically provided for free as they come to the customer with the cost of the hardware. Therefore, the app store does not typically generate revenue on these applications, but expends substantial cost. Apple, Google, Microsoft and other administrators of app stores benefit from the present invention by reducing or eliminating these overhead costs for non-revenue generating applications.

SUMMARY

System and methods are described that permit a user to interact with a remote device through individual user interfaces (UIs) associated with the respective remote device without needing to know a specific application associated with the remote device, or the nature of the remote device. Embodiments may also be used such that one mobile device may be used to display unique user interfaces associated with a plurality of remote devices concurrently or sequentially.

Exemplary embodiments may include a user interface (UI) in which at least a portion of the information necessary to define the UI is served from a remote node or electronic device onto an electronic or mobile device having a user interface mechanism. Therefore, for example, the instructions for the UI, or a portion thereof, may be uploaded to the mobile device from the remote device. In an exemplary embodiment, a user may download one single App to the mobile device, which is a host App or a service that acts like a blank canvas. Then, the content that is painted on that canvas is stored and transmitted to the mobile App from the remote nodes near the mobile device. The uploaded UI that runs on the App on the mobile device can be responsible for pulling larger documents using the cellular, WiFi, or other wireless connection on the mobile device to access to the web to get larger images, files etc., that are requested by the application.

The transmitted UI data may be encoded to make it very efficient and suitable for battery operated devices.

Embodiments described herein include a mobile device such as a smartphone, tablet, watch, dedicated electronic device, controller, display, television, or other device with a user interface. The mobile device includes hardware and software for performing the features described herein. For example, the mobile device may include a processor, display, memory, and wireless communication interface. Software, as non-transitory machine readable instructions, is stored in the memory and executed by the processor on the remote device. An application may be downloaded to the mobile device and stored in the memory of the mobile device. The mobile device processor then executes the application.

Embodiments of the system include a plurality of remote devices with wireless communication interfaces that communicate with the wireless communication interface of the mobile device. The remote devices include memory that stores information that may be communicated to the mobile device through the communication interface. The application stored on the mobile device, when executed by the processor of the mobile device, is configured to retrieve information transmitted by the remote device and render a user interface associated with the remote device. The remote device may include instructions for creating a unique user interface on the mobile device display that are communicated to and then decoded or read by the mobile device through the application. The user interface may include input and output features, such that the user may provide feedback to the remote device by manipulating the user interface.

In an exemplary embodiment, the application on the mobile device receives variables sent from the remote wireless device in a broadcast mode to the mobile device that is in range, but not ones which are not in range. The range can be set by a user of the mobile device and/or the remote device hardware or software.

Embodiments described herein may use a very small uniquely designed set of controls that allows a developer using the system to create custom buttons, sliders, objects, colors, text, pictures and other UI objects on the mobile device display for the user to interact with. Accordingly, the remote device may send a small amount of data wirelessly to the mobile device causing the mobile device to render information to the user graphically, enabling easy interaction that is practical and effective.

FIGURES

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

System and methods are described herein that permit a user to interact with a remote device through individual user interfaces (UIs) associated with the respective remote device from a mobile device without needing to know a specific application associated with the remote device, or the nature of the remote device. Embodiments may also be used such that one mobile device may be used to display unique user interfaces associated with a plurality of remote devices through a single application.

With exemplary embodiments described herein, the remote device can transmit configuration information to the user's mobile device causing different UIs to render on the fly on the mobile device. Exemplary embodiments may be used as a Push-User Interface (PUI) for electronic devices, such as smartphones and tablets and other similar devices, including personal computers, watches, etc.

An exemplary system permits communication with and display of a unique user interface on a mobile device associated with one or more remote devices. The system therefore comprises a mobile device having a user interface and a processor, and a remote device having memory, where the mobile device and remote device also include communication interfaces. The system uses a general application saved and executed on the mobile device to receive and interpret instructions received from information stored on the remote device to create a user interface unique and specific to the remote device according to the instructions associated therewith. The system may be used to display a plurality of unique user interfaces associated with different ones of a plurality of remote devices through a single downloaded base application run on the mobile device. The system may therefore be used without needing to individually identify and download different applications from the mobile device associated with each remote device.

Figure 4:
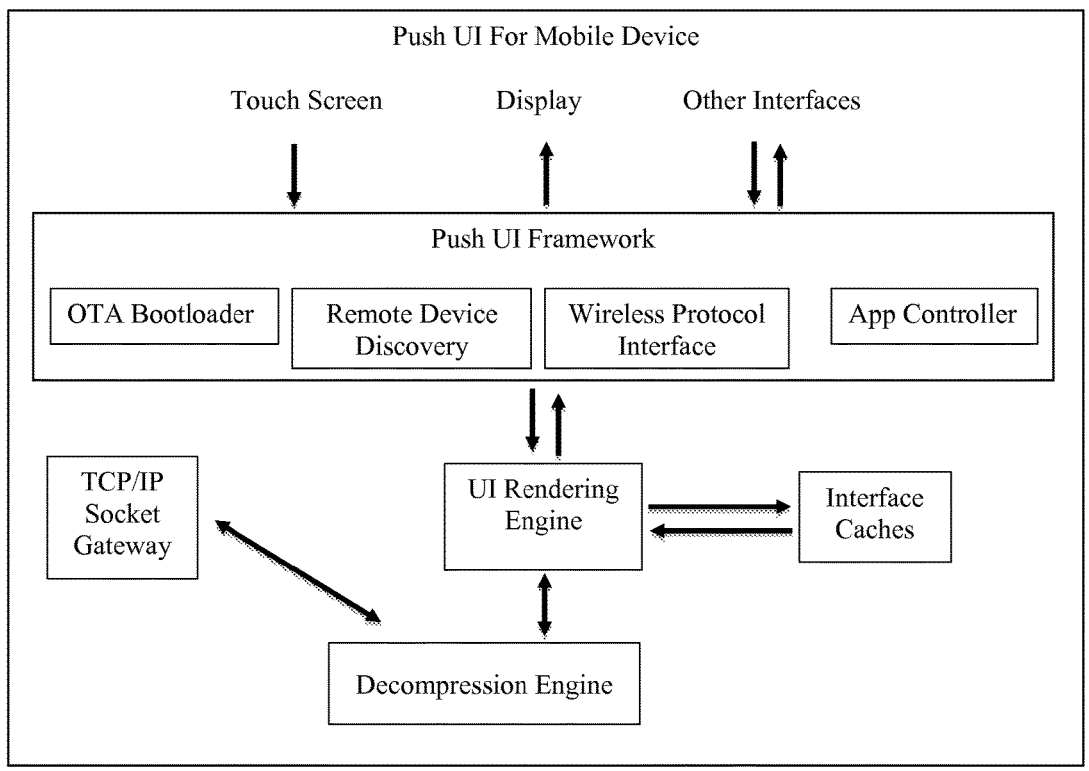
FIG. 4 illustrates an exemplary block diagram of the software and hardware components for the mobile device side of the UI application according to embodiments of the invention.

Although embodiments of the invention may be described and illustrated herein in terms of mobile devices, it should be understood that embodiments of this invention are not so limited, but are additionally applicable to any device having wireless communication capability, memory, processor, and user interface. The exemplary embodiments of the mobile devices described herein include a user interface to display a UI to a user through the host application, see, e.g. FIG. 4.

Exemplary embodiments described herein are in terms of remote devices. The remote devices may be any physical object and may have coupled thereto, or integrated therewith communication modules as described herein. The communication module may be any electronic component for communicating with the mobile device and have stored therein program code for the mobile device to render the UI.

The system uses communication interfaces between the mobile device and remote device to transfer and execute information to create the unique user interface from the remote device to and onto the mobile device. An exemplary embodiment of a communication interface uses a wireless RF module or IC which has a processor to execute instructions and to communicate with another device using WiFi, Bluetooth, or other means. An exemplary RF Module contains a radio transceiver and microprocessor having flash (non-volatile) memory. For the communication interface associated with the remote device, the RF Mobile may contain a housing surrounding the radio transceiver and microprocessor, and may include a plurality of pins coupled to the housing to provide power and data into and out of the RF Module. The exemplary processor is capable of running instructions for controlling the pins of the RF Module and interacting with hardware local to or coupled to the RF Module, like LEDs, door locks, etc. The RF Module may include memory for storing user code inside of the RF Module. The user can load their own code (program) aimed at running in the microcontroller itself Exemplary embodiments of the communication interface include a micro size, wireless RF Module that has Ultra Low Power Bluetooth smart-phone connection and also point to multi-point communication. Micro size may be determined by a person of skill in the art based on the physical object to which the RF Module is associated. For example, the RF Module may be micro sized if it is less than 25 mm×25 mm, or approximately 15 mm33 15 mm. An exemplary RF Module may be the RFD22301 sold by RF Digital Corporation, which contains a radio transceiver and microprocessor having flash (non-volatile) memory. There is 128 k of user code space available inside of this module, and the user can load their own code (program) aimed at running in the microcontroller itself.

The communication device includes a wireless communicator, which can be one of any dozens of wireless Bluetooth Low Energy devices available in the world. Bluetooth is only exemplary, such as for use as a communication means to smartphones, other types of communication can be used. Although exemplary embodiments described herein use Bluetooth Low Energy to communicate between the mobile device and remote communication device, embodiments are not so limited as the communication and mobile devices do not need to use Bluetooth Low Energy. Bluetooth Low Energy is just one of the base protocols that may be use, but is not limited to any one protocol. For example, any wireless protocol can be used such as Bluetooth, Near Field Communication (NFC), WiFi, cellular, etc.

Figure 1A:
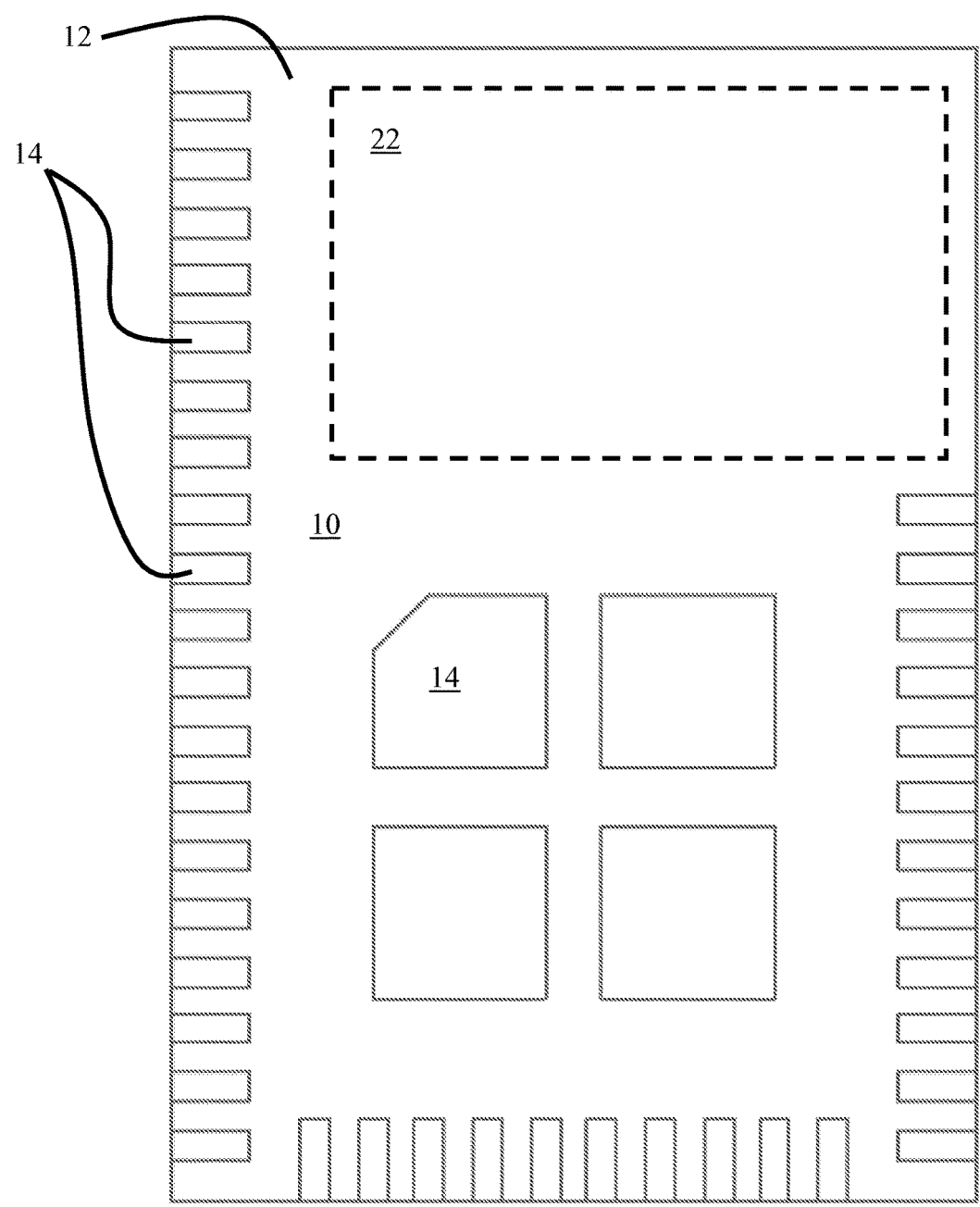
FIG. 1A illustrates an exemplary communication module according to embodiments described herein.
Figure 1B:
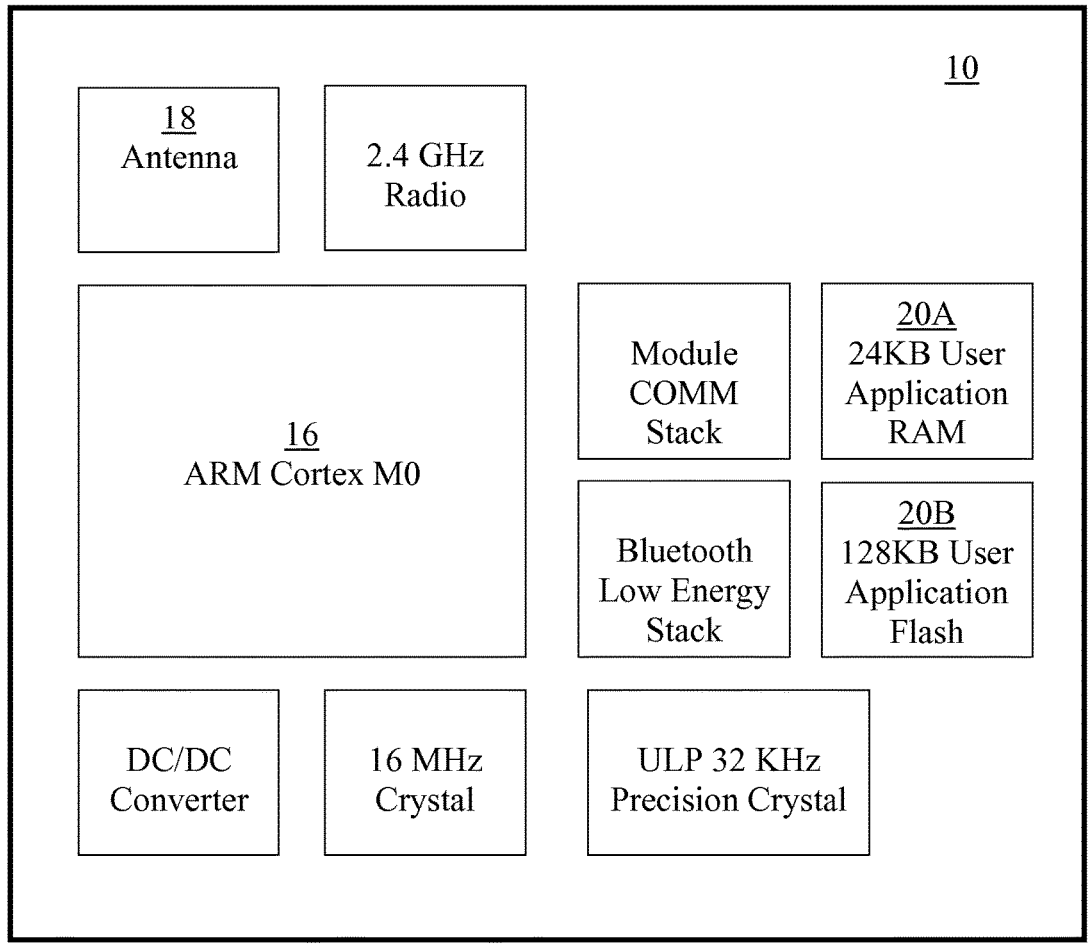
FIG. 1B illustrates a block diagram of exemplary internal components of exemplary communication module of FIG. 1A.

FIG. 1A illustrates a top view of an exemplary RF Module 10 according to embodiments described herein. The RF Module 10 may include a housing 12 enclosing exemplary components, such as those illustrated in FIG. 1B. The housing 12 may include one or more pins or connectors 14 for receiving or sending power or data to and from the RF Module 10. FIG. 1B illustrates a block diagram of exemplary internal components of the RF Module 10. The RF Module 10 may include a processor 16, memory 20, and antenna 18. The memory may include, for example, RAM 20A and Flash 20B. The memory may be available for user applications and program code. The processor 16 is configured to receive and execute the instructions stored in memory and perform the functions described herein. The antenna 18 permits radio frequency signals to be transmitted and received, such that the RF module may communicate with other devices, such as the mobile device described herein.

The exemplary RF Module can communicate with a mobile device via its on-board Bluetooth radio. The RF Module can send and receive control signals and variable data from itself or other devices that are connected to the RF Module to the mobile device for display to the user.

Figure 5:
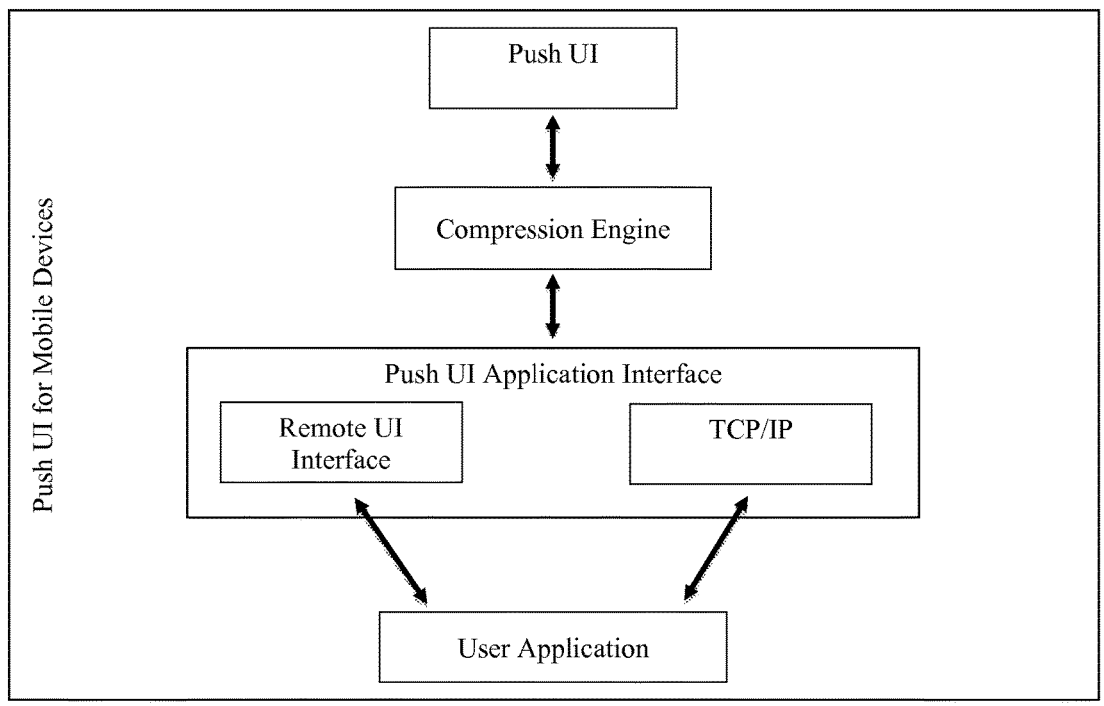
FIG. 5 illustrates an exemplary block diagram of the software and hardware components for the remote hardware side of the UI application according to embodiments of the invention.

Exemplary embodiments described herein use the exemplary memory (i.e. 128 kb of code space of FIG. 2) in the RF Module for the dual purpose of storing the instructions for the framework on the module, and storing the information that will configure the UI on the mobile device, see e.g. FIG. 5. Then, once the mobile device communicates with the module, the UI description may be automatically or selectively uploaded to the mobile device. This removes the need for the user having to go and download new applications for every different type of remote device they want to interface with.

Figure 2:
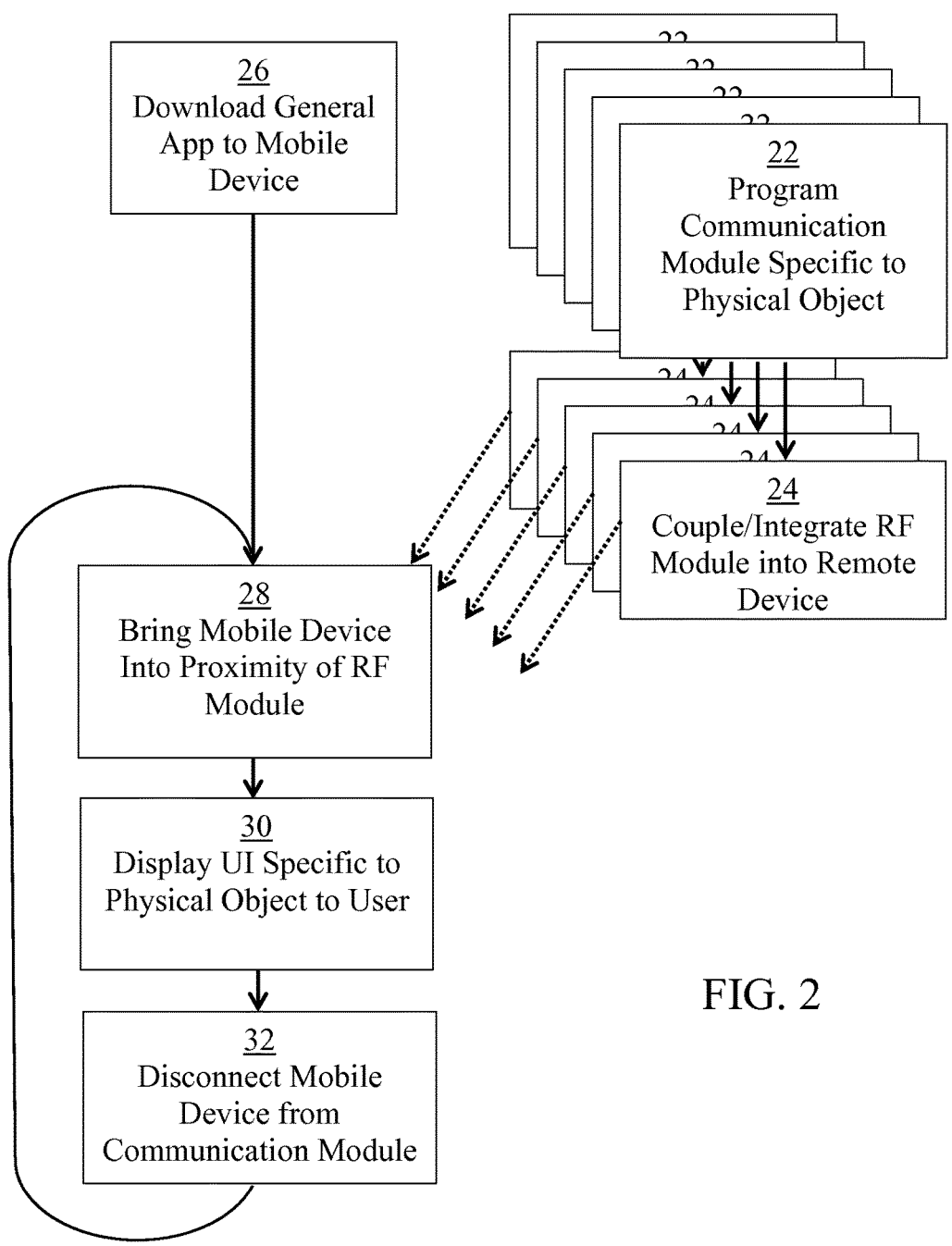
FIG. 2 illustrates an exemplary method of using the exemplary system described herein.

FIG. 2 illustrates an exemplary block diagram of a method of using embodiments described herein. At step 22, the communication module is programmed with its own program code and the UI program code to be displayed on the mobile device. In an exemplary embodiment, the mobile device UI and the local program are both written in the same program running in the remote device. At step 24, the communication module may be optionally coupled to or integrated with the physical object. The communication module may also be used by itself, such that it need not be integrated with a physical object. Exemplary physical objects may be passive objects in which the user interface is configured to provide information about. For example, the physical object may be artwork in which the user interface is configured to display information, such as date, artist, value, etc. to the user. Exemplary physical objects may also be those in which information or data is configured to be sent or received to or from the user and displayed to the user on the user interface. For example, physical objects may include diagnostic monitors (for biological and non-biological use, such as temperature, humidity, heart rate, flow rates, etc.). Exemplary physical devices may therefore be any object.

At step 26, a user downloads a general application onto the mobile device. The general application provides a frame work to support the user interface, but does not include any specific configuration or instructions associated with the application or physical object of step 22. The host program that runs on the mobile device may be written in programming languages which are native to the specific type and class of mobile device.

At step 28, the user brings the mobile device within a configured distance of the communication module. The communication module then sends the UI program code to the mobile device. At step 30, the general application executes the UI program code to display the user interface specific to the application or physical object to the user. At step 32, the communication device and mobile device are disconnected when the mobile device is removed from the proximity of the communication device.

Portions of the method may be repeated, such that any number of a plurality of devices may be programmed and communicate with the mobile device, at steps 22 and 24, as illustrated by the repeated steps 22, 24. The user, after having downloaded the single general application at 26, may repeat steps 28, 30, and 32 to connect and disconnect from any one or more of the plurality of remote devices. The steps 26, 28, and 30 may also be repeated with multiple remote devices, such that a plurality of UI associated with different remove devices may be run or displayed concurrently in separate UI windows, or integrated to form a single UI experience.

The General App, Program Code of the Communication Module, and combinations thereof may include specific configuration parameters. For example, the user of the mobile device or creator of the remote communication device may select a threshold distance in which the mobile device will interact with the communication module. This may be controlled through hardware, software, or a combination thereof The General App may also be configured such that a specific user can configure the UI displayed given the same program code received from the communication module. For example, a user of the mobile device may select font sizes, display positions, languages, etc. that are interpreted with the program code received from the communication module to render a unique user interface for the specific combination of mobile device and remote device. Therefore, the system may be configured such that a unique user interface is created for each remote device of a plurality of remote device. The system may further be configured such that the unique user interface may be modified to an individual user interface or to a pre-set selection of user interface options based on the specific mobile device communicating with the remote device. Therefore, the unique user interface may or may not be unique or may or may not be semi-unique across mobile devices communicating with the same remote device.

In an exemplary embodiment, the communication device may also provide more than one program code option to the mobile device. The mobile device may then be configured by a user to select a specific one program code from those available. For example, different program codes may be available based on language. The user of the mobile device may program the General App to automatically select which program code to retrieve and execute from those available.

The Communication module and/or General App may also have other configuration parameters, such as whether to automatically accept a communication; whether and what kind of verification is necessary before permitting a communication; the manner and way in which one or more available communications are presented, selected, or launched; etc.

Exemplary systems and methods described herein may be used with all different types and classes of remote devices. As a single application is run on the mobile device, the single application may interface with the mobile device according to the mobile device requirements. The single application may, however, provide a unified platform for receiving instructions from any different type or class of remote device. Therefore, in an exemplary embodiment, the remote device, external to the mobile device to which the mobile device communicates with wirelessly, stores the actual program the user sees and is responsible for Pushing (uploading) the UI description to the mobile device. The remote device may also store and upload portions or instructions of the program for generating the user interface or may store and push other descriptions, codes, or other mechanisms for defining one or more attributes of the user interface. This UI description that is uploaded to the mobile device by the remote module device can be considered a second level program that runs on top of the lower level program that is native to the mobile device that was downloaded from an application-store.

In an exemplary embodiment, a plurality of remote devices may interact to create a single user interface. For example, a first remote device may create a first unique user interface. One or more other remote devices may be used to add or modify the first unique user interface to provide one or more other unique user interfaces. For example, additional remote devices may be used to unlock or make available additional UI features.

In an exemplary embodiment, the uploaded UI description can also be considered the customization of the user interface (UI) for the user. It can contain timers, and triggers for specific behaviors as well. Also, the UI is not only limited to a UI which suggests graphical and user inputs and displays for a user, but includes any data transmission to a user (i.e., display, sound, or other sensory interface). Therefore, although embodiments of the invention may be described and illustrated herein in terms of a visual user interface for representation on a display of the mobile device, it should be understood that embodiments of the invention are also applicable to other user interface devices, such as speakers to provide sound output. The user interface may be any executable instruction or portion thereof received from the remote device and executable through the host program, launched by the host program, or stored on the mobile device, or stored and launched directly on the mobile device. The UI, therefore, includes any combination of receiving and sending information between the mobile device and the communication module.

In an exemplary embodiment the user App on all phones, is a single App and the variables for defining a given user interface are sent from the remote device in a broadcast mode to any mobile device within a specified range. The range can be set by the user of the mobile device and/or the remote communication device.

Figure 6:
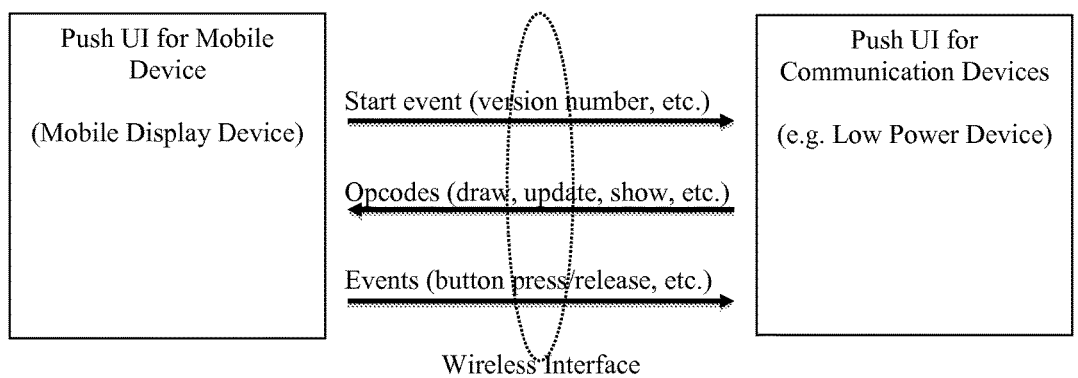
FIG. 6 illustrates an exemplary overview of the communication occurring between the exemplary mobile device and the exemplary remote hardware device.
Figure 8:
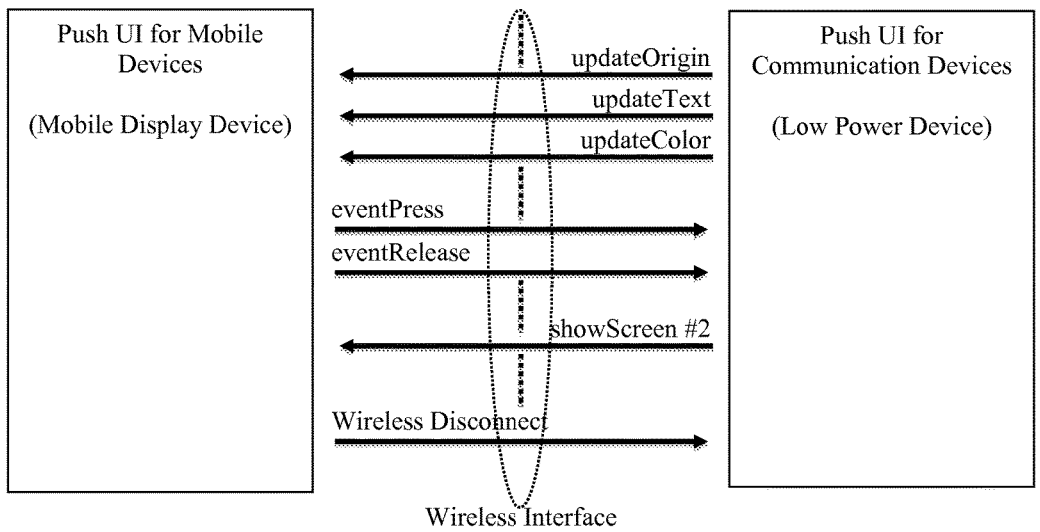
FIG. 8 illustrates an exemplary communication occurring between the exemplary mobile device and the exemplary remote hardware device after the initial communication of FIGS. 4A or 4B.

In an exemplary embodiment, the Push-UI does not use HTML, or other mark-up language. There is a large demand for ultra-low power devices that can run on batteries. When a device runs on a battery, it needs to send very small amounts of data, very quickly and limit activities to those that are necessary to perform a given function. HTML is not well suited for this, it is very heavy weight and involved. In an exemplary embodiment, the Push-UI uses a very small uniquely designed set of controls, which are transmitted in binary fashion, that allows a developer to create custom buttons, sliders, objects, colors, text, pictures and other UI objects on the mobile device display for the user to interact with. The remote device sends a small amount of data wirelessly to the mobile device causing the mobile device to render information to the user graphically, enabling easy interaction that is practical and effective, see, e.g., FIGS. 6 and 8. In an exemplary embodiment, small amount of data is the amount of data stored within 128 kb or less of memory. In an exemplary embodiment, the Push-UI is described using HTML.

If larger display objects are needed than is possible to store in code on the remote device, a reference or placeholder may be used as representative of the object. For example, the code may include a reference ID that is sent to the mobile device, which would connect over a wireless connection to a network, such as the internet, that has saved thereon a larger file size associated with the reference ID. The mobile device would then download the large size image file or other type of file, perhaps a music file from the internet, which the mobile device can be connect to, and execute the retrieved file through the general application. The system may also be configured such that larger sized files that may be used may be downloaded or pre-loaded on the mobile device prior to use with a plurality of remote devices. For example, if a user participates in a trade show, the user may download a trade-show file prior to the trade show that is used with the UI code stored on the remote devices of the tradeshow to provide access to larger files to be used on the mobile devices when the unique UI is rendered on the mobile device. Therefore, embodiments of the system may be used for larger UI rendering without a continuous or simultaneous connection of the mobile device to the network or internet hosting the larger data files.

In an exemplary embodiment, Push-UI is its own environment. It may therefore not be compliant or conforming to industry standards. It can use a single point of reference and with X and Y distances in pixels from that reference, a user can very easily code to display text or images or controls anywhere they wish, even overlapping, so the rules are free and flowing.

Exemplary embodiments described herein may be used to permit a user to accept or decline receipt of the secondary code offered by the remote device. The user may also customize received information by pre-selecting which packets to accept, which to reject, or selecting a display style or other customizable features associated with the UI. Therefore, each user of mobile device may receive different UI results when approaching the same remote device pushing the same UI secondary program.

Figure 3A:
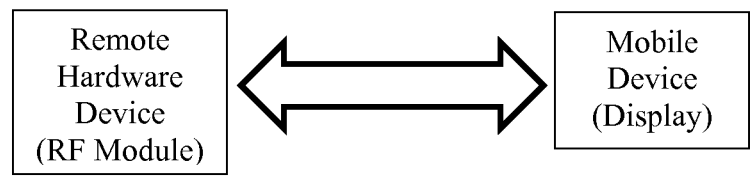
FIG. 3A illustrates an exemplary communication between a mobile device and remote communication devices according to embodiments described herein.
Figure 3B:
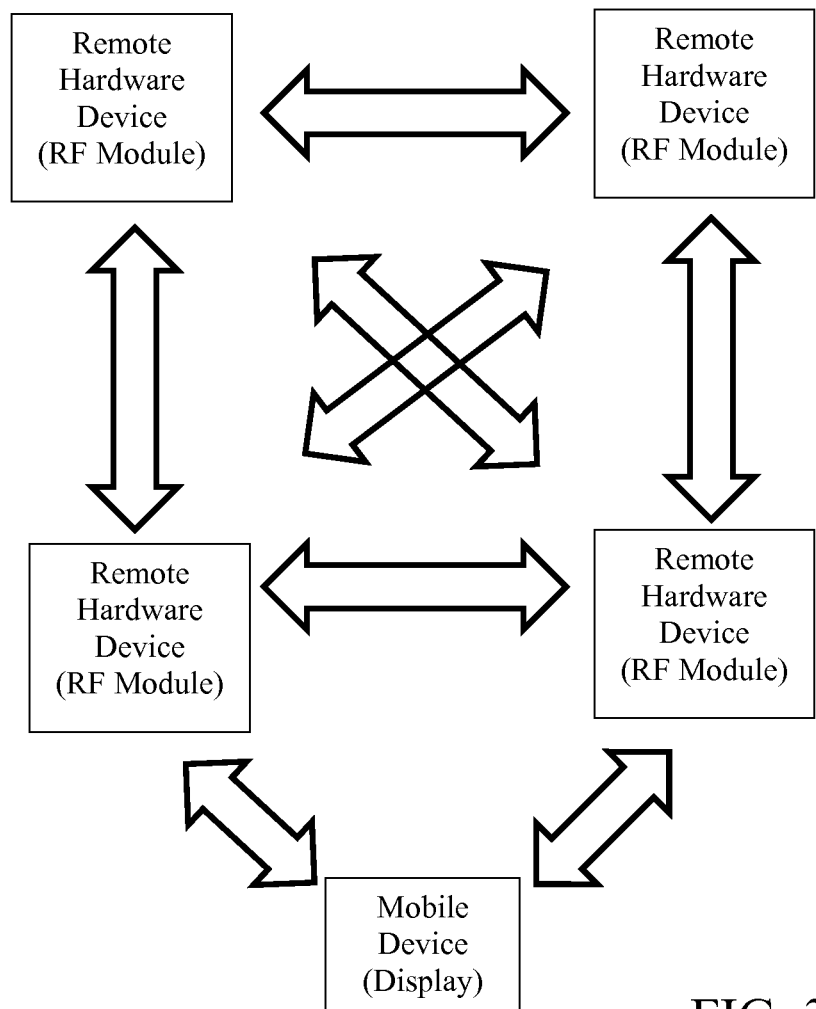
FIG. 3B illustrates an exemplary communication network between a mobile device and a plurality of unique remote communication devices according to embodiments described herein.

In an exemplary embodiment, the user of the mobile device can choose to have this sort of a relationship with multiple remote devices, by the user's choice, or perhaps set by specific settings on the mobile device to allow or disallow easy selection of remote nodes with whom to receive an uploaded UI description. Selecting a UI description will permit the UI to be displayed on the mobile device and may allow the mobile device to interact with the RF module that pushed that UI to them, see e.g., FIG. 6. For example, as illustrated in FIG. 3A, a user, through their mobile device, may interact with a single remote hardware device. The mobile device may also communication with a plurality of remote hardware device sequentially or individually, such that the communication between any one remote device is the same as that of FIG. 3A. Alternatively, as seen in FIG. 3B, a user, through their mobile device, may interact with a plurality of networked remote hardware devices. As shown in FIG. 3B, the remote hardware devices may also interact with each other, such that one or more remote hardware devices propagate necessary information through a chain of linked remote hardware devices to the remote mobile device. Alternatively, the mobile device may be optional, such that information is merely passed and/or stored between communication devices of the remote hardware devices. One or more of the remote devices may also include a user interface for the other of the plurality of remote devices, such that a separate mobile device is not necessary.

In an exemplary embodiment, the General App that loads onto the mobile device is a single program that allows communication with a plurality and possibly an unlimited number of remote nodes (such as RF Modules, that may be using Bluetooth Low Energy). When the general application is running on the mobile device, it may have a list feature, to present a list to the users or remote devices of all the different remote RF module nodes to which it can communicate with based on being in range of communication. For example, when a user is within 1,000 feet or less between the mobile device and the remote node, an option may be presented to the user to view the UI associated with the remote node. Within the 1000 feet, there might be hundreds or more of these remote devices, shown in the list on the mobile device of the user for the user to choose from.

That volume of possible items to choose from can be overwhelming for the user and actually cause the act of connecting to one specific remote device over the plurality of available devices to be prohibitive to the user. In an exemplary embodiment, the remote nodes can be displayed on the user's mobile device based on some priority or hierarchy. For example, the available nodes may be ordered based on signal strength or other methods determining physical distance between the mobile device and the remote node. This feature makes this activity very effective and therefore usable. Alternatively, other methods of priority may be used. For example, the priority may be based on the use history of the user, such that the most recent used or the most used selections are present first or last. A combination of priorities may also be used.

In an exemplary embodiment, when a specific range or comparative signal strength is achieved, an automatic re-organization of the list may occur to where the very closest remote node will be at the top of the list and easy to select. Therefore, a user can confirm the desired selection by simply moving the mobile device closer to the remote device and confirm it remains the top selection.

Alternatively, the UI may be configured to automatically select a UI associated with a remote device based on a predetermined proximity or relative signal strength of one remote node to another. Therefore, if the user is sufficiently close to any given remote device, the UI may automatically launch. In this case, the proximity may be within inches or even require actual contact. Proximity or actual contact may be detected by either the proximity between the remote device and mobile device, such as determined by signal strength or physical location detection, or as determined by other sensors of the mobile device (pressure, accelerometer, etc.) such that the act of bringing the mobile phone sufficiently close indicates the desire to launch the UI. Other motions or actions of or on the mobile device may be used to indicate a desire to launch the UI. Thus, for example, a user may simply bring the mobile device into range, touch, or otherwise appropriately orient the device or perform the necessary actions with or on the phone with respect to the remote device to automatically activate the associated UI. The user may, for example, select accept options that pop up through the general application. The user may also orient or move the phone relative to the remote device such as by turning the mobile device relative to the remote device to indicate a desire to launch the UI. The specific motions, inputs, contacts, or other actions may be used as safeguards to launching the UI for specific applications. For example, when used with a keyless entry, the phone may require one or more specific motions and/or one or more specific data entries before the UI is even launched.

In an exemplary embodiment, the geographical location of each of the remote nodes can be reported to the mobile device, allowing the mobile device application to display graphically to the user in a list, grid, map, or other format the collective locations of the local nodes, allowing the user to easily see identification information from them, allowing the user to choose to which one to connect to and receive a UI to conduct more intimate communication. The graphical display may also include the location of the mobile device, such that the user may use the graphical display to navigate the plurality of remote nodes to physically move the mobile device toward a desired location corresponding to a specific physical remote node.

In an exemplary embodiment, an auto-mapping feature can be employed where the remote nodes can all communicate with each other to form a constantly updating map of their relative locations, allowing others with smartphones to be constantly updated with an accurate local map relative to the mobile device and/or one or more remote devices. The communication relay, such as that represented in FIG. 3B may be used to identify objects even outside of the range of the mobile device, thus tracking all objects within a proximity of either the mobile device or other remote device.

Exemplary embodiments may also be used as a mobile device application itself, which can perform short range mapping with each other, pass data back and forth to form a map of the mobile devices (smart-phones) themselves near each other. For example, is a user is in a crowd of thousands of people and each person's cell phone, without needing cellular service at all, can relatively to each other form a map of everyone's locations and each person with their smart-phone can see on a map where others are and locate them.

Exemplary embodiments described herein use, but are not limited to using, Bluetooth Low Energy (BLE) interface in smartphones, tablets and similar devices. The entire design and purpose of the smartphone to have the Bluetooth circuit inside is to communicate with slave devices and be in control of them as a remote piece of hardware. Embodiments described herein alleviate the time intensive manual process of locating, downloading, and connecting a user interface for individual slave devices. According to exemplary embodiments, a single App is downloaded on all mobile devices or smart devices, and when that App comes into range of any remote hardware, the remote hardware automatically and wirelessly makes the appropriate UI information available to the near-by user's mobile device. So the user no longer needs to go search for and install an app to perform a very simple, often one time interface with one of millions of different devices in the world around them.

Figure 7A:
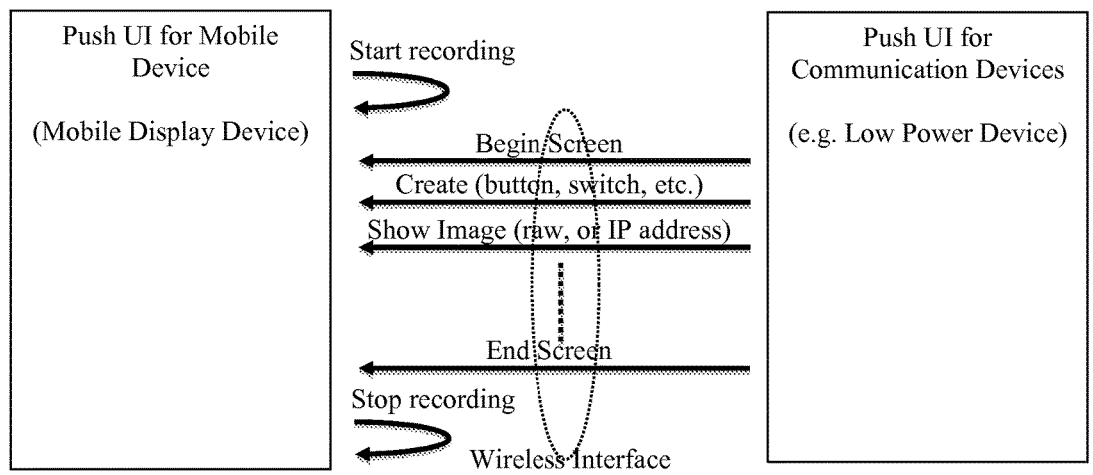
FIG. 7A illustrates an exemplary communication occurring between the exemplary mobile device and the exemplary remote hardware device when the UI is not cached.
Figure 7B:
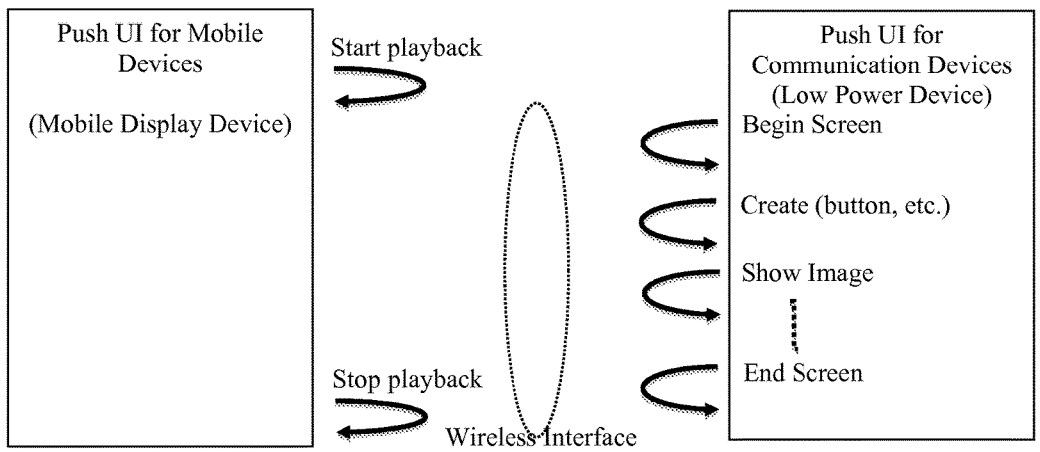
FIG. 7B illustrates an exemplary communication occurring between the exemplary mobile device and the exemplary remote hardware device when the UI is cached.

The current and conventional way for a UI to be rendered on the screen of a smartphone today is for the user to download it manually, ahead of time, before attempted usage of a wireless device such as a heart rate monitor, equipment at the gym, doors to which they want access to and would like to enter using a code. That makes this entire world of applications virtually impossible due to lack of practicality. Push-UI enables the UI to simply show up, automatically on the user's mobile device that is near-by. The user simply uses the application, which automatically goes away once the user moves away from the device to which they were interfacing with. It only takes a few seconds to upload a completely new UI to the user's mobile device, see, e.g., FIG. 7A. This time may be reduced to milliseconds when the user returns to the same type of remote device, since the UIs can be cached in the user's mobile device for even faster re-rendering, see, e.g., FIG. 7B. If the Push-UI app was updated at the remote node, the system may download the updates automatically, without user intervention, see, e.g., FIG. 7A.

Exemplary embodiments also may allow the user to make in field updates regardless of the phones. The user no longer needs to keep updating their code for every new device, whether or not it had previously been launched. Phones and tablets change every 6 months, new ones are launched, Push-UI allows the remote product manufacturer to have support for tomorrow while coding just once today. This is a big issue with industry products today which Push-UI solves. This one technology does not need to be constantly upgraded with release of new phones and devices. A plurality of applications also need not be re-downloaded by a user to continue communication with a plurality of remote devices each time a mobile device is replaced.

Exemplary applications are infinite. Exemplary application are provided herein and below as representative of combination of features that may be selected based on the system configuration and use.

Embodiments described herein have application in the internet of things. As a specific example, if a user buys a coffee maker and a refrigerator from different manufacturers. A first manufacturer can program a first communication device specific to the coffee maker and integrate a first communication device with the coffee maker. A second manufacturer can program a second communication device specific to the refrigerator and integrate the second communication device with the refrigerator. A user of the refrigerator and coffee maker would not need to download two different applications onto their phone. Instead, the user downloads a single general application. When the phone is brought within a first given proximity of the coffee maker, the user interface specific to the coffee maker is shown to the user through the general application. When the phone is brought within a second given proximity of the refrigerator, the user interface specific to the refrigerator is shown to the user. The user therefore just needs the one Push UI application, and the custom UI description for each hardware device will be uploaded to the mobile device when the mobile device is in proximity of the remote device and the user chooses to use it.

Exemplary embodiments may be used as program for providing information about a plurality of objects, such as at a museum or art gallery. So once a user is physically near the hardware, such as a painting in a gallery, the user interface (UI) is transmitted from the communication module coupled to or associated with the painting to the smart-phone by the hardware itself. Therefore, the need for downloading individual Apps for every remote hardware devices that is intended to be interfaced with (i.e. every painting in a gallery) is removed. If the mobile device is near a painting, just the text related to that painting and maybe a couple buttons and user controls are rendered for the user. When the user moves to another painting, the display may be completely different as that next painting may be more complex and has more features requiring more user controls that are automatically rendered for the user. Therefore, each UI associated with each object may be specifically designed relative to each painting.

Exemplary embodiments may be used for displaying or as a user interface for monitoring or active devices, such as heart rate monitors. For example, the RF Module may be connected to a heart rate monitor, and the RF Module may be configured to send identification such as serial numbers, the heart rate values, and other information from the heart rate monitor to the mobile device for display. A remote device may be integrated with a step counter coupled to a running shoe, where the communication device comprises the push UI as described herein. Other applications include wireless thermostat for a property or keyless entry system for a door. With Push UI, all the user needs to do is download a single app onto their phone or mobile device and the custom programs needed for each of these three very different types of products are pushed from the product (loaded from the product or from the hardware itself) to the mobile device and not via the app-store.

Embodiments described herein may be used to track or map objects, such as inventory. For example, the local map can be used in a car dealership, where the local map of all the cars around a user with a mobile device in a car lot can be displayed on the mobile device. Thus, even if the cars were moved around all the time, the displayed map and associated relative information displayed per vehicles in proximity to be selected by a user would be current and updated automatically.

Exemplary embodiments may be used to improve throughput efficiencies or replace queues or lines or provide information to a user, such as about which line or queue they should be in. In an exemplary application, a user can walk into a pharmacy and fill out their form using their smart device for their prescription instead of waiting in line physically. The user then has the freedom to walk around, because when they are in range of the pharmacy counter, a special UI is rendered on their phone allowing them to understand what line they were about to stand in and its function. The user may also have preselect through the general application specific language selections, such that the user can even read the received information in their own pre-selected language. Exemplary embodiments may therefore be used to overcome the language barrier. The mobile device may be used to translate the received information, or the mobile device may determine which UI sent from the remote device to use based on language selections. Specific UI options may therefore be broadcast with the UI data, such that the mobile device can determine which UI to select.

As another queue example, exemplary embodiments can also be used for drive through food ordering. When a driver pulls up in a drive through, the menu is rendered on the smartphone or on the vehicle display which allows the driver to place their order in real-time interactively. This also allows the driver to pull into another drive through and get a completely different UI displayed for them relating to that drive through.

Push-UI can be used with the popular asset-trackers, which is a Bluetooth Low Energy device that acts as a beacon and sends a transmission every so often which is received by a smartphone and indicates the distance to the object to which it is attached to help you find your personal items. If Push-UI is used in this application, the device itself can hold important information about the asset itself and not require a lot of confirmation and setup by the user with specialized applications.

Exemplary embodiments may also be used for advertising to smart devices. In an exemplary embodiment, as a user enters a specific area such a trade show, the system can cause the pre-loading of files onto the user's smart-phone, in anticipation of the probable use. This drastically increases the speed of when data is available to a user.

Also if a user is at a trade-show, and walking by hundreds of booths, each booth can have a radio device located at it and as the user comes into range of that specific booth, embodiments described herein can display on their smartphone or tablet information relating to the offerings of the specific booth and the user can interface with the booth managers without even needing physical interaction. The user can add themselves to queues, such that a user need not stand in a physical line. The user can choose to exchange information with the booth managers or choose not to. This removes the need for carrying badges at shows and scanning badges. Also, if a user walked by a booth which was of interest, the system may be used to cache data for the user to view later, so it can provide an audit trail for the user as well. The trade show example permits provides an opportunity for hundreds of remote devices to be in range of the mobile device, as the user walks the isles of the show. In an exemplary embodiment, the UI may be configured to present a graphical interface of available device. The graphical interface may order the available devices such that whichever booth the user is closest to at that moment is displayed at the top of the list defining all of the options to select. Accordingly, in an exemplary embodiment, available UI options may be displayed to a user for selection or activation in a prioritized way. The priority may be based on the closes proximity between the remote device and the mobile device, such that the closest one will be at the top of the list.

Exemplary embodiments described herein may be used in gaming applications. For example, a first remote device may be used to create a first unique user interface, while one or more other remote devices may be used to supplement or modify the user interface to provide additional features or alternatives for use by the user. Therefore, users may change their gaming experience by receiving additional remote devices. In an exemplary embodiment, the gaming application may include trading cards or other memorability or toy object that creates a user interface on the mobile device. As the user collects more objects the functions available on the user interface increase.

Google, Apple, Microsoft, and other App stores may benefit from embodiments described herein. These exemplary embodiments are not intended to compete with these stores, but instead, may be used to reduce or eliminate overhead and testing costs associated with the non-revenue generating applications that are associated with most connected devices. Exemplary embodiments described herein may be used to distribute a cost generating software app to users, while leaving the testing and confirmation of the hardware related application to the hardware developer. As such, the App Store increases the overall profit, by driving revenue generating purchases and/or reducing costs in handing and approving hardware based applications.

Exemplary embodiments described herein also facilitate entry into the smart market for device manufacturers. Exemplary embodiments may lower the bar and make it easier for hardware manufactures to enter the app and digital marketplace. This results in a larger overall marketplace. Custom apps are permitted which provide important product differentiation for the hardware manufacturer, but simplifies launch and use in the digital marketplace to facilitate acceptance by customers.

Some portions of the detailed descriptions above are presented in terms of algorithms or instructions and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

While some specific embodiments of the invention have been shown, the invention is not to be limited to these embodiments. For example, one or more components and algorithms are shown to perform specific functions described herein. There functions and components may be recombined in any way to achieve the desired results of a given application. For example, components may be integrated or subdivided, removed, duplicated, or substituted for equivalent components. Functions similarly may be integrated, removed, modified, or added depending on the desired application. The invention is to be understood as not limited by the specific embodiments described herein, but only by scope of the appended claims. Any list of features therefore identified as and, or, and/or are intended to include the each of the others, such that any list of items A, B, and (or) C is intended to include A, B, or (and) C, and any combination of A, B, and/or C.

What is claimed is:

1. A method comprising:
   receiving, at a mobile device, location information from a network of remote devices distinct from the mobile device,
      wherein the location information identifies, for each remote device of the network, a location of that remote device relative to one or more other remote devices of the network, and
      wherein the location information is determined, at least in part, based on communications between the remote devices of the network;
   displaying, using the mobile device, a graphical representation of the network of remote devices to a user;
   determining that the mobile device is in proximity to a first remote device from among the remote devices of the network;
   responsive to determining that the mobile device is in proximity to the first remote device, automatically receiving, at the mobile device, first executable code from the first remote device, the first executable code comprising computer instructions for generating a first user interface specific to the first remote device, the first executable code defining one or more user-interactive control elements for controlling the first remote device; and
   automatically executing the first executable code using the mobile device, wherein executing the first executable code causes the mobile device to generate the first user interface and display the first user interface, including at least one of the user-interactive control elements, to the user.

2. The method of claim 1, wherein the graphical representation comprises summary information associated with each of the remote devices of the network, and user-selectable graphical elements for selecting any one of the remote devices of the network.

3. The method of claim 1, wherein displaying the graphical representation of the network of remote devices comprises graphically displaying a present location of the mobile device with respect to the locations of the remote devices of the network.

4. The method of claim 3, wherein graphically displaying the network of remote devices comprises:
   displaying at least one of a list, a grid, or a map identifying the remote devices of the network, and
   modifying at least one of the list, the grid, or the map according to at least one of a search criterion, a filtering criterion, or a sorting criterion.

5. The method of claim 4, wherein modifying at least one of the list, the grid, or the map comprises modifying an order of the list based on a proximity of the mobile device to each of the remote devices of the network.

6. The method of claim 1, wherein determining that the mobile device is in proximity to the first remote device comprises:
   determining that the mobile device is within a pre-determined distance from the first remote device.

7. The method of claim 6, further comprising:
   determining, using the mobile device, that the mobile device is beyond the pre-determined distance from the first remote device; and
   responsive to determining that the mobile device is beyond the pre-determined distance from the first remote device, discontinuing display of the first user interface.

8. The method of claim 1, further comprising:
   determining that the mobile device has been moved according to a pre-determined movement or a combination of pre-defined movements while the mobile device is within a pre-determined distance from the first remote device, and
   wherein the first executable code is automatically received and executed using the mobile device further responsive to determining that the mobile device has been moved according to the pre-determined movement or the combination of pre-defined movements while the mobile device is within the pre-determined distance from the first remote device.

9. The method of claim 1, further comprising:
   determining that the mobile device has been brought into physical contact with the first remote device, and
   wherein the first executable code is automatically received and executed using the mobile device further responsive to determining that the mobile device has been brought into physical contact with the first remote device.

10. The method of claim 1, further comprising:
    determining that the mobile device is in proximity to a second remote device from among the remote devices of the network;
    responsive to determining that the mobile device is in proximity to the second remote device, automatically receiving, at the mobile device, second executable code from the second remote device, the second executable code comprising computer instructions for generating a second user interface specific to the second remote device, the second executable code defining one or more second user-interactive control elements for controlling the second remote device; and
    automatically executing the second executable code using the mobile device, wherein executing the second executable code causes the mobile device to generate the second user interface and display the second user interface, including at least one of the second user-interactive control elements, to the user, and wherein the second user interface is different than the first user interface.

11. The method of claim 1, wherein first executable code further comprises an indication of a behavior of the first user interface, and an indication of a timer or a trigger associated with the behavior.

12. The method of claim 1, wherein first executable code further comprises a binary representation of the one or more user-interactive control elements in the first user interface.

13. The method of claim 1, wherein first executable code further comprises a binary representation of at least one of a user-interactive button or a user-interactive slider in the first user interface.

14. The method of claim 1, wherein executing the first executable code comprises:
    executing a first level application on the mobile device, wherein the first level application is native to the mobile device, and executing the first executable code by interpreting the first executing code using the first level application, wherein the first executable code is executed as a second level application running on top of the first application.

* * * * *